United States Patent [19]
Mukerjee et al.

[11] Patent Number: 5,479,484
[45] Date of Patent: Dec. 26, 1995

[54] METHOD AND APPARATUS FOR FACILITATING THE MAKING OF WIRELESS TELEPHONE CALLS

[75] Inventors: Sandip Mukerjee, Jackson; Ralph Utano, Fairhaven, both of N.J.

[73] Assignee: AT&T Corp., Murray Hill, N.J.

[21] Appl. No.: 251,811

[22] Filed: May 31, 1994

[51] Int. Cl.⁶ ..................................................... H04Q 7/38
[52] U.S. Cl. ............................... 379/60; 379/59; 455/33.2
[58] Field of Search ........................ 379/59, 60; 455/33.1, 455/33.2

[56] References Cited

U.S. PATENT DOCUMENTS 5,090,050  2/1992  Heffernan ................................. 379/60
5,353,331  10/1994  Emery et al. ............................. 379/60

Primary Examiner—Dwayne D. Bost
Attorney, Agent, or Firm—Eugene J. Rosenthal

[57] ABSTRACT

The lack of uniformity for accessing wireless carriers to reach roaming wireless telephones prevents nationwide wireless telephone service from being provided in a seamless manner by an automated system that accesses the roamer access ports to connect a caller to a wireless telephone station in a manner such that the roaming nature of the called wireless telephone station is transparent to the caller. This problem is overcome, by a method for placing a telephone call to a wireless telephone station, method including the steps of: a) storing in a data base an association between respective (i) roamer access ports, (ii) mobile switching centers and (iii) one of a predetermined set of instructions, i.e., rules, which are executed by the machine in order to access wireless telephone service at mobile switching centers: b) receiving an indication of the particular mobile switching center presently serving the wireless telephone station; c) looking up the indication in the data base to retrieve (i) a particular roamer access port associated with the particular mobile switching center serving the wireless telephone at the location and (ii) a rule to access wireless telephone service at the mobile switching center via the roamer access port associated with the mobile switching center; d) placing a call to the roamer access port; and e) executing the instructions of the retrieved rule for the roamer access port so as to cause the mobile switching center to attempt to establish a connection to the wireless telephone station.

8 Claims, 4 Drawing Sheets

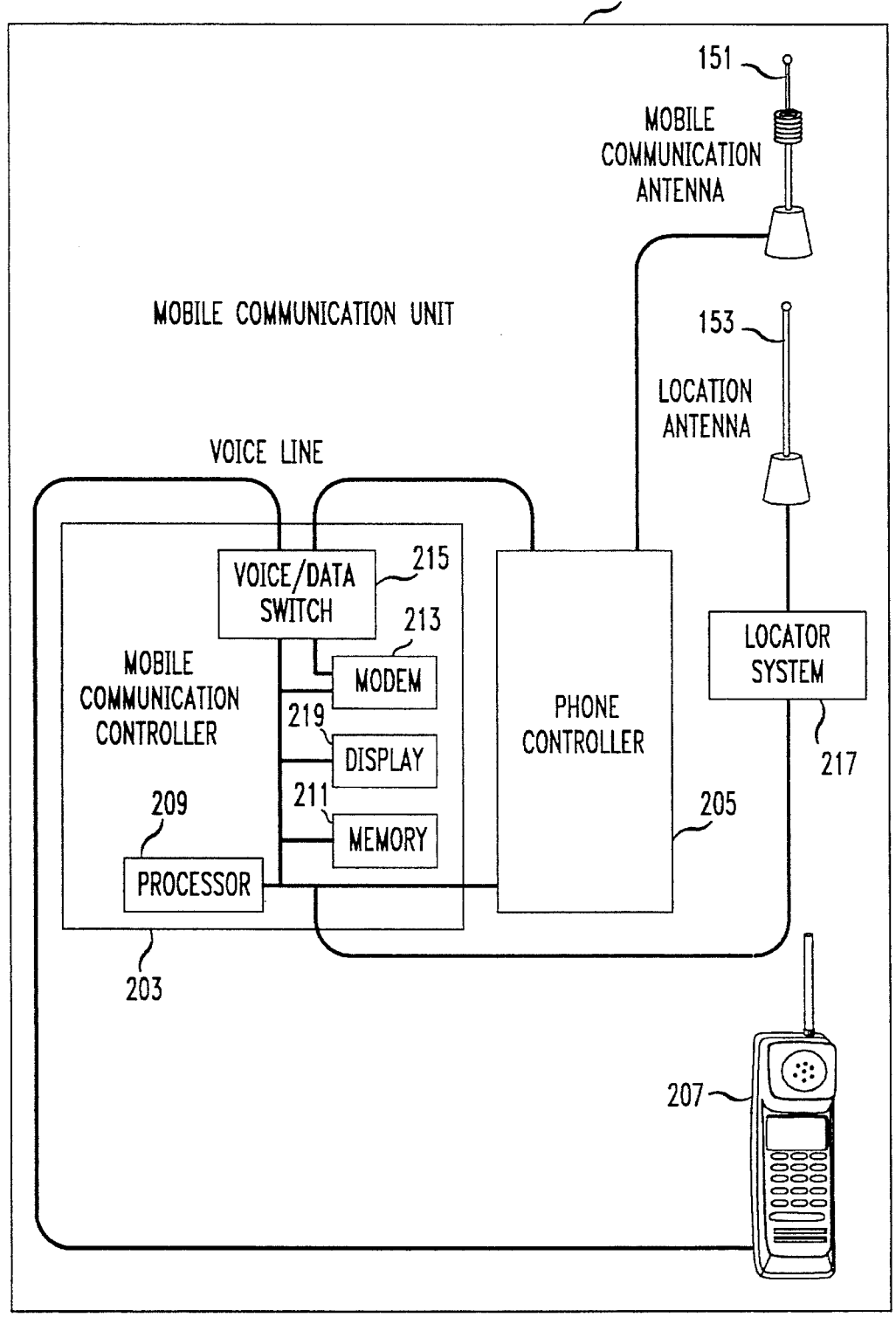

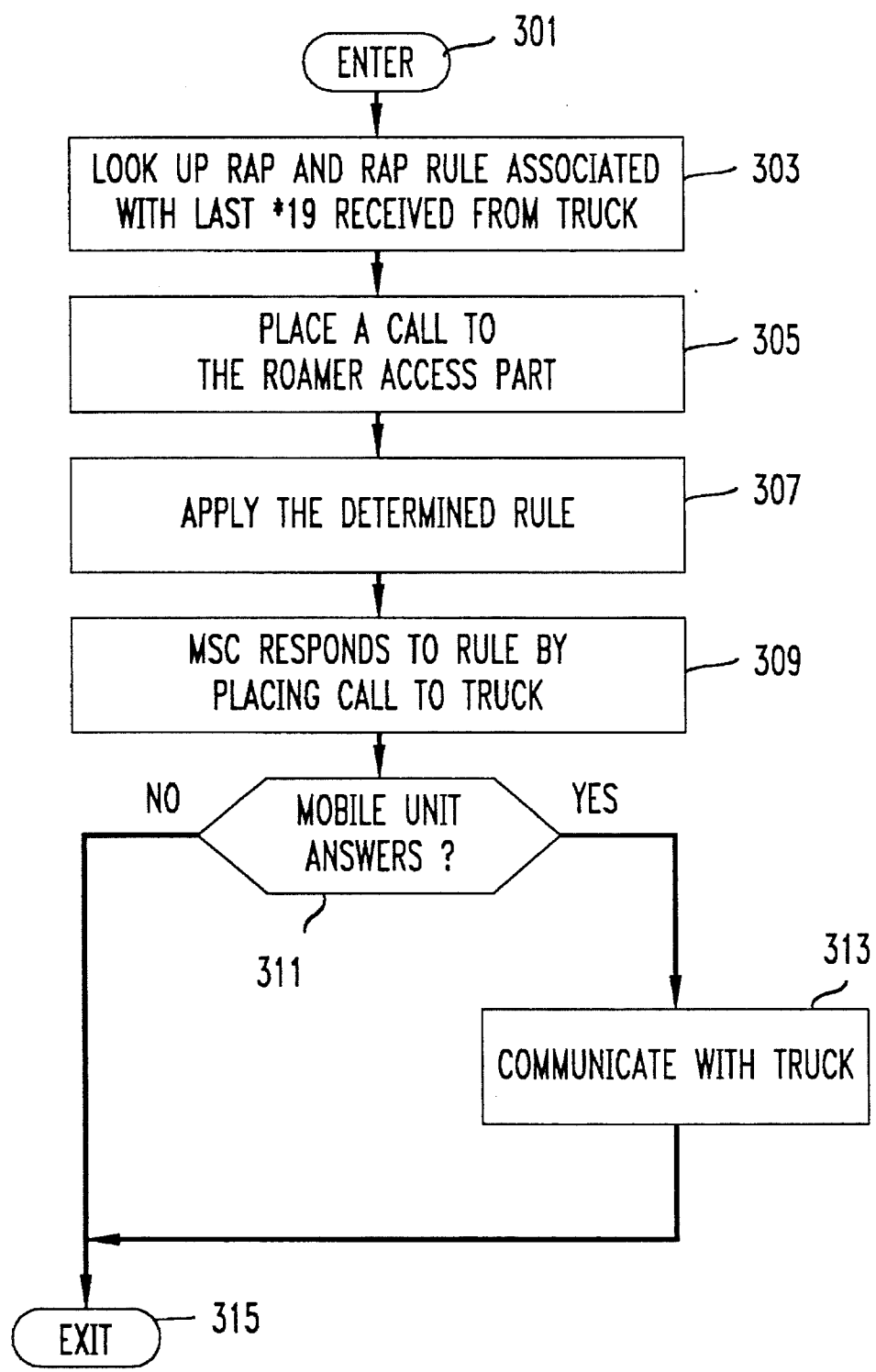

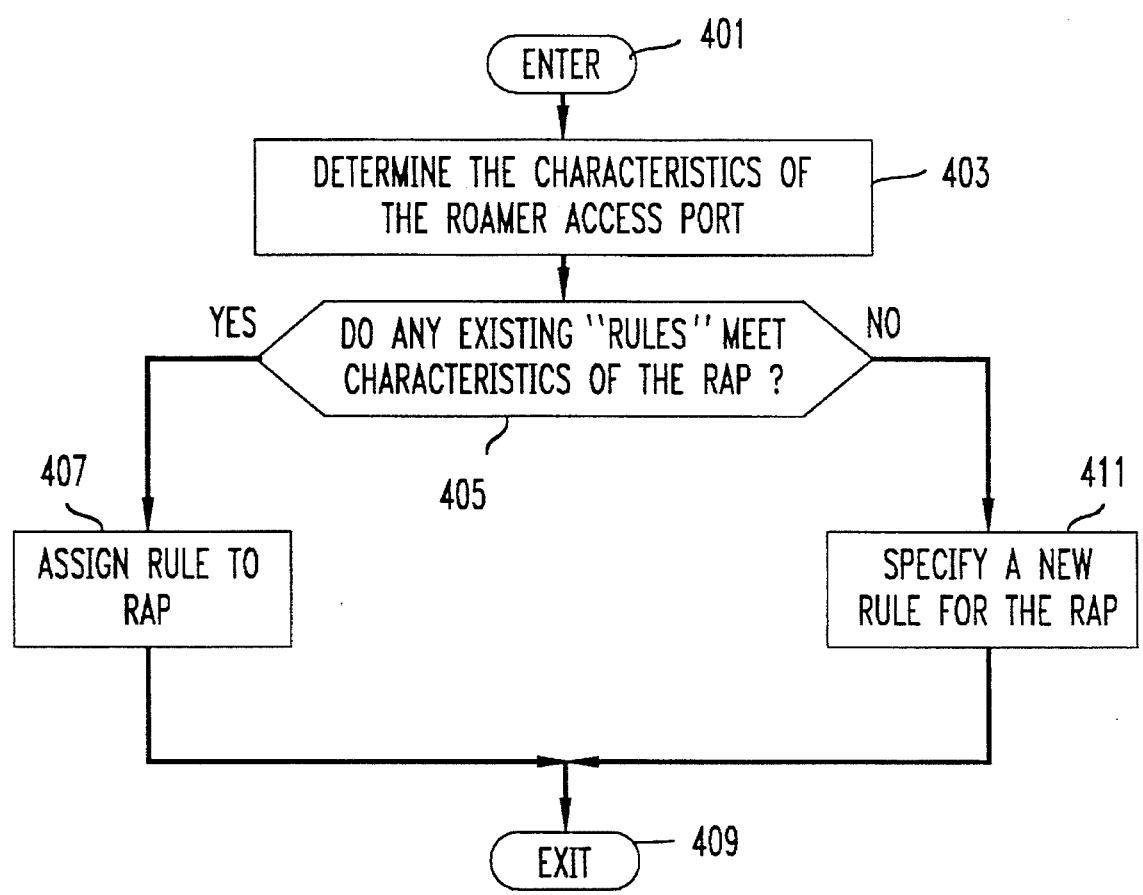

5,479,484

METHOD AND APPARATUS FOR FACILITATING THE MAKING OF WIRELESS TELEPHONE CALLS

TECHNICAL FIELD

This invention relates to the processing of wireless telephone calls, and more particularly, to the processing of wireless telephone calls where the called wireless telephone is roaming outside of its local service area.

BACKGROUND OF THE INVENTION

Wireless telephone service is typically provided by a plurality of mobile telephone service providers. Each mobile telephone service provider provides "local" wireless telephone service to its subscribers. Each wireless telephone service provider may also provide so-called "roaming" wireless telephone service to the subscribers of other wireless telephone service providers. In order to place a telephone call to the wireless telephone station of a person who is roaming outside of his local area and is being served by a wireless telephone service provider other than his local wireless telephone service provider i.e., a roaming wireless telephone service provider, it is necessary to call the so-called "roamer access port" of the roaming wireless telephone service provider and to provide the mobile identification number (MIN), i.e., the telephone number, of the called person.

SUMMARY OF THE INVENTION

We have recognized that, due the multiplicity of switch manufacturers and software releases, that the roamer access port provides several different prompts to request the MIN of the called person's wireless telephone station. These prompts vary widely in their characteristics, which include the type of signaling they give to a caller and the length of time prior to their expecting to receive the digits of the MIN. Additionally, due to variations in switch loading, which occurs with the change in telephone traffic being carried by the mobile switching center, no single rule based on a fixed delay can be derived to determine when to supply the MIN to the roamer access port. This problem prevents nationwide wireless telephone service from being provided in a seamless manner by an automated system that accesses the roamer access ports to connect a caller to a wireless telephone station in a manner such that the roaming nature of the called wireless telephone station is transparent to the caller.

This problem is overcome, in accordance with the principles of the invention, by a method for placing a telephone call to a wireless telephone station, the telephone call having to be routed by a machine to the wireless telephone station via a roamer access port, the method including the steps of: a) storing in a data base an association between respective (i) roamer access ports, (ii) mobile switching centers and (iii) one of a predetermined set of instructions, i.e., rules, which are executed by the machine in order to access wireless telephone service at mobile switching centers; b) receiving an indication of the particular mobile switching center presently serving the wireless telephone station; c) looking up the indication in the data base to retrieve (i) a particular roamer access port associated with the particular mobile switching center serving the wireless telephone at the location and (ii) a rule to access wireless telephone service at the mobile switching center via the roamer access port associated with the mobile switching center; d) placing a call to the roamer access port; and e) executing the instructions of the retrieved rule for the roamer access port so as to cause the mobile switching center to attempt to establish a connection to the wireless telephone station. If the mobile switching center successfully locates the wireless telephone station, the caller's call is connected over a mobile telephone channel to the called wireless telephone station. Advantageously, since a rule is stored for each roamer access port in the country, nationwide wireless telephone service can be provided in a seamless manner by an automated system.

BRIEF DESCRIPTION OF THE DRAWING

In the drawing:

FIG. 2 shows an exemplary mobile communication unit used in the truck of FIG. 1;

FIG. 3 shows an exemplary process which implements aspects of the invention in the context of the truck location and communication system of FIG. 1, and FIG. 4 shows a flow chart of an exemplary process for assigning a new roamer access port rule to either a new roamer access port or to the roamer access port of a mobile switching center whose roamer access port characteristics have been changed.

DETAILED DESCRIPTION

Figure 1:
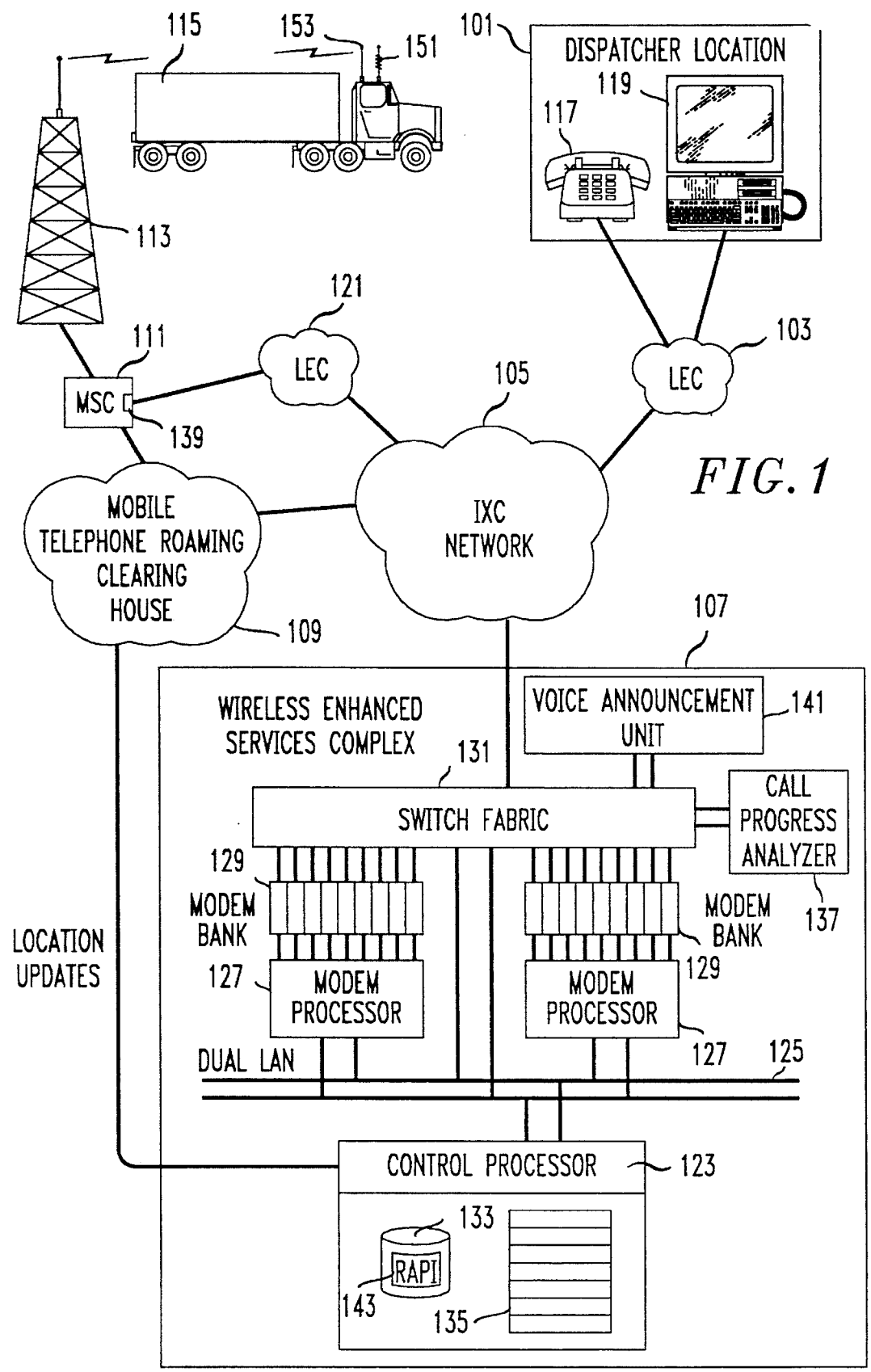
FIG. 1 shows an overview of a truck location and communication system which operates in accordance with the principles of the invention.

The problem associated with using an automated system that accesses the roamer access ports to connect a caller to a wireless telephone station in a manner such that the roaming nature of the called wireless telephone station is transparent to the caller is overcome, in accordance with the principles of the invention, by a) storing in a data base an association between respective (i) roamer access ports, (ii) mobile switching centers and (iii) one of a predetermined set of rules for accessing wireless telephone service at mobile switching centers; b) receiving an indication of the particular mobile switching center presently serving the wireless telephone station; c) looking up the indication in the data base to determine (i) a particular roamer access port associated with the particular mobile switching center serving the wireless telephone at the location and (ii) a rule to access wireless telephone service at the mobile switching center via the roamer access port associated with the mobile switching center; d) placing a call to the roamer access port; and e) applying the determined rule to cause the mobile switching center to attempt to locate the wireless telephone station. If the mobile switching center successfully locates the wireless telephone station the caller's call is connected over a mobile telephone channel to the called wireless telephone station.

Before proceeding directly to a description of a process embodying the invention, it is useful to understand the context in which the invention was developed and in which it is initially being used, namely, a truck dispatching and control application. Therefore, FIG. 1 shows an overview of a truck location and communication system which affords truck dispatchers 1) the ability to determine the location and other information regarding each truck for which the dispatcher is responsible as well as 2) the ability to communicate with such trucks wherever they are. The truck location and communication system includes a) dispatcher location 101, b) local exchange carriers (LECs) 103 and 121, c) interexchange carrier (IXC) 105, d) wireless enhanced services complex (WESC) 107, e) mobile telephone roaming clearing house 109, f) mobile switching center (MSC) 111, g) mobile base antenna tower 113, and h) truck 115.

Dispatcher location 101 includes telephone 117 and terminal 119, which has a built-in modem. Telephone 117 and terminal 119 are each connected to LEC 103 via respective telephone lines. A dispatcher at dispatcher location 101 uses terminal 119 to view the locations of each truck and exchange data with the trucks. For example, terminal 119 is a personal computer running display and data communication software. The dispatcher uses telephone 117 for voice communication with the drivers of the trucks.

LECs 103 and 121 are employed in the conventional manner to achieve connections to IXC network 105. It is noted that LECs 103 and 121 may be the same. IXC network 105 is employed to establish connections from truck 115 and dispatcher location 101 to wireless enhanced services complex 107. Wireless enhanced services complex 107 may be thought of as being located "in" or "behind" IXC network 105 as those terms are conventionally used in the art.

The conventional purpose of mobile telephone roaming clearing house 109 is to authenticate mobile telephone subscribers who are roaming outside of their home service area. One well known mobile telephone roaming clearing house is provided by GTE Telecommunications Services Incorporated (TSI). In particular, for the present application, mobile telephone roaming clearing house 109 receives a location indication from MSC 111 whenever a truck enters a new service area. This location indication is described further below. It is relayed by mobile telephone roaming clearing house 109 to wireless enhanced services complex 107. Despite being coarse, the location indication provides a first approximation of the location of the truck that has been found to be very useful in long haul trucking applications. Advantageously, it is provided at no additional cost to the trucking company using the truck location and communication system.

MSC 111 is used to establish mobile telephone communications with truck 115 via mobile base antenna tower 113. MSC 111 also transmits a location indication for truck 115 whenever truck 115 activates its mobile telephone within the area served by MSC 111. In particular, the location indication is provided in response to the transmission of a "*19" signal from the mobile telephone in truck 115 to MSC 111. Conventionally, in cellular telephone communication, the transmission of a *19 indicates a request to deactivate cellular roaming. MSC 111 forwards the "*19" signal to mobile telephone roaming clearing house 109 along with the mobile identification number (MIN) of the transmitting truck 115. Roamer access port 139 is a dedicated port at which mobile switching center (MSC) 111 receives calls for wireless telephones that are roaming in the area served by mobile switching center (MSC) 111.

Mobile telephone roaming clearing house 109 is preprogrammed to recognize the MINs of mobile telephones used in trucks that are served by wireless enhanced services complex 107. When mobile telephone roaming clearing house 109 receives a *19 transmission from a mobile telephone having a MIN belonging to a truck served by a wireless enhanced services complex 107, mobile telephone clearing house 109 transmits a location indication update to wireless enhanced services complex 107 identifying the mobile service provider now serving truck 115 rather than performing the conventional cellular roaming deactivation.

Wireless enhanced services complex 107 includes a) control processor 123, b) dual local area network (LAN) 125, c) modem processors 127, d) modem banks 129, e) switch fabric 131, f) call progress analyzer 139, and g) voice announcement unit 141. Control processor 123 provides all the computational capability necessary to control the overall operation of wireless enhanced services complex 107. Control processor 123 contains memory 133 and code 135. Memory 133 is used to store information such as a list of trucks using the service as well as for temporary storage of data being communicated between the trucks and dispatcher location 101. Code 135 is used to store the computer instructions which operate control processor 123.

Dual LAN 125 provides connectivity between control processor 123, modem processors 127 and switch fabric 131. It is a dual LAN for reliability purposes. Modem banks 129 are each made up of one or more modems which are used to transmit and receive information over telephone lines. Modem processors 127 are each responsible for controlling the individual modems within the respective modem banks 129. Modem processors 127 also pass data between switch fabric 131 and control processor 123 via their respective one of modem banks 129 and dual LAN 125. Switch fabric 131 provides connections between telephone lines of IXC network 105 and the proper modem of modem banks 129. Switch fabric 131 can also connect together, i.e., bridge, two telephone lines from IXC network 105.

Call progress analyzer 137 electronically "listens" for call progress signals and announcements on calls. Voice announcement unit 141 plays various announcements to callers as appropriate.

FIG. 2 shows an exemplary mobile communication unit 201 used in truck 115 to communicate with wireless enhanced services complex 107 and ultimately dispatcher location 101. Mobile communication unit 201 includes a) mobile communication controller 203, b) phone controller 205, c) telephone handset 207, d) mobile communication antenna 151, e) locator system 217 and f) location antenna 153.

Mobile communication controller 203 includes 1) processor 209, 2) memory 211, 3) modem 213, 4) voice/data switch 215, and 5) display 219. Processor 209 provides all the computation capability necessary to control the overall operation of mobile communication unit 201. Modem 213 is used to convert data from processor 209 to a form suitable for transmission over a mobile telephone channel. Memory 211 stores, among other things, accumulated data for ultimate transmission to dispatcher location 101 as well as data received from dispatcher location 101. Data received from dispatcher location 101 is displayed for the driver of the truck on display 219.

Voice/data switch 215 is used to control the source that is connected to the mobile telephone channel. Either telephone handset 207 or modem 213 may controllably be given access to the mobile telephone channel. Voice/data switch 215 is responsive to commands from processor 209 to determine whether telephone handset 207 or modem 213 is given access to the mobile telephone channel.

Phone controller 205 provides the capability to transmit and receive communication over the mobile telephone channel. Phone controller 205 accesses the mobile telephone channel via mobile communication antenna 151.

Locator system 217 receives triangulation information via location antenna 153 to determine the precise location of truck 115. This information is stored in memory 211 for ultimate transmission to dispatcher location 101. Such locator systems are well known.

FIG. 3 shows an exemplary process for initiating a voice telephone call from wireless enhanced services complex 107. The process is entered in step 301 when a request to call a particular truck 115 is received at wireless enhanced services complex 107. The request may be received over a data call, e.g., from terminal 119, or via a voice call, e.g., from a conventional voice telephone. If the request is a data call, the data supplied as part of the call request will specify the truck identification number of the particular truck to be called. If the request is a voice call, the caller will be prompted by voice announcement unit 141 of wireless enhanced services complex 107 to enter the identification number of the particular truck to be called.

Next, in step 303, wireless enhanced services complex 107 looks in its memory to determine the telephone number of the roamer access port (RAP) and the corresponding roamer access port rule for the mobile switching center (MSC) 111 from which a registration, e.g., a "*19", was last received from mobile communication unit 201 of the truck 115 being called. Each roamer access port rule is a predetermined set of instructions that make up a process that instructs switch fabric 131 as to when is the proper time for it to supply to roamer access port 139 of the determined mobile switching center (MSC) 111 the mobile identification number (MIN), i.e., the telephone number, of truck 115 so that mobile switching center (MSC) 111 will attempt to establish a call to truck 115. To this end, at present, each rule is an instruction to electronically "listen" for a series of call progress tones which must be detected prior to supplying the MIN of truck 115. This listening is performed by call progress analyzer 137, which is bridged onto the call to roamer access port 139. An example of a rule is to listen for voice energy, e.g., an announcement instructing the caller to wait for dial tone prior to supplying the MIN of truck 115, and, after detecting that the voice energy has subsided, to listen for dial tone. Upon the detection of dial tone from the roamer access port, switching fabric 131 supplies, e.g., using dual tone multi-frequency signals, the MIN of truck 115 to roamer access port 139 of mobile switching center (MSC) 111. If the MIN is not supplied at the correct time, mobile switching center (MSC) 111 will not attempt to call truck 115.

In step 305, wireless enhanced services complex 107 places a call to roamer access port 139 of the determined mobile switching center (MSC) 111. This call is initially a data telephone call via one of the modems in modem bank 129. The rule determined in step 303 is then applied in step 307 and the MIN of truck 115 is supplied to roamer access port 139 of mobile switching center (MSC) 111. In step 309, mobile switching center (MSC) 111 responds to the supplying of the MIN of truck 115 according to the roamer access port rule by placing a call to truck 115.

Control then passes to conditional branch point 311, which tests to determine if the called mobile communication unit 201 of truck 115 answered the call. If the test result in step 311 is YES, control passes to step 313 and the caller may communicate with the truck. If the call requested is a voice call, rather than a data call, wireless enhanced services complex 107 transmits a message to mobile communication unit 201 instructing mobile communication controller 203 to place voice/data switch 215 in the voice communication mode. Doing so connects telephone handset 207 to phone controller 205. Switch fabric 131 bridges the caller's call with the call that was placed to truck 115. For a requested voice telephone call, switch fabric 131 disconnects from the call the modem through which the data call to truck 115 passed at enhanced services complex 107. The process then exists in step 315.

If the test result in step 311 is NO, control passes directly to step 315 and the process is exited. The caller's call and the call to roamer access port 139 of mobile switching center (MSC) 111 are both disconnected.

FIG. 4 shows a flow chart of an exemplary process for assigning a new roamer access port rule to either a new roamer access port or to the roamer access port of a mobile switching center (MSC) whose roamer access port characteristics have been changed. New roamer access ports may be added to existing mobile switching centers (MSC) or they may be part of a new mobile switching center (MSC) added to a network. A roamer access port's characteristics may change when the mobile switching center (MSC) to which it belongs receives a software or hardware upgrade. It can be deduced that a change has occurred in an existing roamer access port's characteristics if all, or an excessively large portion, of the calls made to that roamer access port fail.

The process is entered in step 401 when it is determined that a rule must be assigned to a roamer access port. Next, in step 403, the present characteristics of the roamer access port are determined. This may be done by dialing the roamer access port and using call progress analyzer 137 to detect the sequence of call progress tones and announcements supplied by the roamer access port. Conditional branch point 405 tests to determine if any of the existing roamer access port rules match the characteristics of the just tested roamer access port. One way of doing this is to compare the characteristics of the just tested roamer access port against the characteristics of other roamer access ports to which rules are assigned and assigning to the just tested roamer access port the rule used by a roamer access port having matching characteristics. Another way of doing so is to test the roamer access port using several iterations of each available rule and assigning the rule that has the greatest success rate.

If the test result in step 405 is YES, control passes to step 407 and the determined rule is assigned to the roamer access port. This assignment is stored in roamer access port information (RAPI) 143 stored in memory 133. The process is then exited in step 409.

If the test result in step 405 is NO, control passes to step 411 and a new rule is specified for the roamer access port. If call progress analyzer 137 is able to determine the nature of the various signals supplied by the roamer access port, a rule may be automatically created by listing the identity of the various signals and specifying the point at which the MIN of the desired truck should be supplied to the roamer access port. The point at which the MIN of the desired truck should be supplied to the roamer access port is either upon detection of a dial tone or the detection of silence after detection of the call progress signals supplied by the roamer access port. If call progress analyzer 137 is not able to determine the nature of one or more of the various signals supplied by the roamer access port, human intervention is required to a) determine the nature of the unknown signals or b) replace call progress analyzer with a model that is capable of determining the nature of the unknown signals. Control then passes to step 407 and the process continues as described above.

Table 1 shows several exemplary rules for accessing roamer access ports.

Table 2 shows associations between exemplary mobile switching centers, their roamer access ports and the roamer access port (RAP) rules.

TABLE 1

Rule 1:

Detect Answer Supervision

TABLE 1-continued

Wait 7 Seconds
Outpulse Mobile Identification Number (MIN)
Rule 2:

Detect Answer Supervision
Detect Dial Tone
Outpulse the Mobile Identification Number (MIN)
Rule 3:

Detect Answer Supervision
Detect 3 Beep Tones (⅛ Second on, ⅛ Second off, 80 HZ)
Outpulse Mobile Identification Number (MIN)
Rule 4:

Detect Answer Supervision
Detect Voice Energy
Detect Removal of Voice Energy
Detect Dial Tone
Outpulse Mobile Identification Number (MIN)

TABLE 2

| Mobile Switching Center | Roamer Access Port | RAP Rule |
| --- | --- | --- |
| 0023045 | 212-735-7626 | Rule 2 |
| 0314530 | 201-354-7626 | Rule 3 |
| 0335405 | 401-353-7626 | Rule 2 |
| 0363434 | 303-456-7626 | Rule 4 |
| 0353343 | 801-423-7626 | Rule 1 |

Those skilled in the art will recognize that the principles of the invention are more generally applicable than the above described truck communication system. For example, a person may register with an intelligent communication system their location and availability to receive mobile telephone calls while they are roaming When a caller wishes to reach such a registered person, the caller calls the intelligent communication system and informs the intelligent communication system of the identity of the person to be called. The intelligent communication system determines the location from which the person last registered and attempts to contact the desired person using the roamer access port, and its corresponding rule, that is associated with the mobile switching center from which the desired person last registered.

The foregoing merely illustrates the principles of the invention. It will thus be appreciated that those skilled in the art will be able to devise various arrangements which, although not explicitly described or shown herein, embody the principles of the invention and are thus within its spirit and scope.

We claim:

1. A method for use in placing a telephone call to a wireless telephone station, said telephone call being routed by a machine to said wireless telephone station via a roamer access port, the method comprising the steps of:

storing in a data base an association between respective (i) roamer access ports, (ii) mobile switching centers and (iii) predetermined sets of instructions for accessing wireless telephone service at mobile switching centers;

receiving an indication of the particular mobile switching center presently serving the wireless telephone station;

looking up said indication in said data base to retrieve (i) a particular roamer access port associated with the particular mobile switching center serving said wireless telephone at said location and (ii) a particular set of instructions for use in accessing wireless telephone service at said mobile switching center via said roamer access port associated with said mobile switching center;

placing a call to said roamer access port;

executing said instructions of said set to cause said mobile switching center to attempt to establish a connection to said wireless telephone station.

2. The invention as defined in claim 1 wherein said mobile switching center causes said telephone call to be completed to said wireless telephone station.

3. The invention as defined in claim 1 wherein said mobile switching center attempts to connect to said wireless telephone station by transmitting a paging signal thereto.

4. The invention as defined in claim 1 wherein said mobile switching center attempts to connect to said wireless telephone station by transmitting a paging signal thereto only after checking its registration memory and determining that said wireless telephone station was currently being served said mobile switching center.

5. The invention as defined in claim 1 wherein said mobile switching center attempts to connect to said wireless telephone station by requesting mobile switching centers that are adjacent to it to transmit a paging signal to said wireless telephone station.

6. The invention as defined in claim 1 wherein said mobile switching center attempts to connect to said wireless telephone station by requesting adjacent mobile switching centers to transmit a paging signal to said wireless telephone station only after checking its registration memory and determining that said wireless telephone station was not currently being served by said mobile switching center.

7. The invention as defined in claim 1 wherein said sets of instructions each defines a process for determining when said machine is to supply to a roamer access port the mobile identification number of said called wireless telephone station.

8. A method for use in placing a telephone call to a wireless telephone station, said telephone call having to be routed by a machine to said wireless telephone station via a roamer access port, the method comprising the steps of:

storing in a data base an association between respective (i) roamer access ports, (ii) mobile switching centers and (iii) one of a predetermined set of rules for accessing wireless telephone service at mobile switching centers;

receiving an indication of the particular mobile switching center presently serving the wireless telephone station;

looking up said indication in said data base to determine (i) a particular roamer access port associated with the particular mobile switching center serving said wireless telephone at said location and (ii) a rule to access wireless telephone service at said mobile switching center via said roamer access port associated with said mobile switching center;

placing a call to said roamer access port;

applying said determined rule to cause said mobile switching center to attempt to locate said wireless telephone station.

* * * * *